United States Patent
Johnson, Jr. et al.

(10) Patent No.: US 10,535,344 B2
(45) Date of Patent: Jan. 14, 2020

(54) CONVERSATIONAL SYSTEM USER EXPERIENCE

(71) Applicant: Microsoft Technology Licensing, LLC, Redmond, WA (US)

(72) Inventors: Joseph Edwin Johnson, Jr., Seattle, WA (US); Emmanouil Koukoumidis, Kirkland, WA (US); Donald Brinkman, Seattle, WA (US); Hailong Mu, Redmond, WA (US); Dustin Abramson, Bellevue, WA (US); Hudong Wang, Bellevue, WA (US); Dan Vann, Duvall, WA (US); Youssef Hammad, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/617,607

(22) Filed: Jun. 8, 2017

(65) Prior Publication Data

US 2018/0358008 A1 Dec. 13, 2018

(51) Int. Cl.
*G10L 15/22* (2006.01)
*G10L 25/63* (2013.01)
(Continued)

(52) U.S. Cl.
CPC ............. *G10L 15/22* (2013.01); *G06F 3/167* (2013.01); *G10L 25/63* (2013.01); *G10L 15/1815* (2013.01); *G10L 2015/227* (2013.01)

(58) Field of Classification Search
CPC ....... G10L 13/027; G10L 21/00; G10L 25/00; G06F 3/0481
See application file for complete search history.

(56) References Cited

U.S. PATENT DOCUMENTS 5,367,454 A * 11/1994 Kawamoto ............ G06N 3/004
345/418
5,732,232 A * 3/1998 Brush, II ................ G06T 11/00
715/751

(Continued)

OTHER PUBLICATIONS

Toscano, Joe, "Designing a Chatbot Conversation: How to Keep Users in the Loop", https://uxdesign.cc/designing-a-chatbot-conversation-how-to-keep-users-in-theloop-4d3a29e44de4, Retrieved on: Feb. 27, 2017, 16 pages.

(Continued)

*Primary Examiner* — Brian L Albertalli

(57) ABSTRACT

Examples of the present disclosure describe systems and methods relating to conversational system user experience. In an example, a conversational system may use one or more sensors of a user device to affect the topic or direction of a conversation or to identify a new conversation topic. The conversational system may also receive input from a user, wherein a GUI may enable the user to specify or alter semantic information used during the conversation. The GUI may comprise one or more skeuomorphic elements designed to provide a familiar or intuitive way for the user to interact with the conversational system. The GUI may also be used to disambiguate messages or convey emotion or sentiment to the user. In another example, haptic or audio feedback may be provided alongside a message to convey emotion to the user during the conversation.

20 Claims, 11 Drawing Sheets

(51) Int. Cl.
*G06F 3/16* (2006.01)
*G10L 15/18* (2013.01)

(56) References Cited

U.S. PATENT DOCUMENTS

| | | | | |
|---|---|---|---|---|
| 5,977,968 | A * | 11/1999 | Le Blanc | G06F 3/0481 463/31 |
| 6,064,383 | A * | 5/2000 | Skelly | G06F 3/04845 715/758 |
| 6,658,388 | B1 * | 12/2003 | Kleindienst | G10L 15/22 704/270 |
| 6,728,679 | B1 * | 4/2004 | Strubbe | G06F 3/011 704/270.1 |
| 7,360,151 | B1 * | 4/2008 | Froloff | G06F 17/248 715/255 |
| 7,930,676 | B1 * | 4/2011 | Thomas | G06F 9/44505 706/45 |
| 7,966,185 | B2 * | 6/2011 | Eide | G10L 13/10 704/258 |
| 8,271,902 | B1 * | 9/2012 | Mangini | H04M 1/72544 715/763 |
| 8,738,715 | B2 | 5/2014 | Roy et al. | |
| 8,751,428 | B2 | 6/2014 | Jerram et al. | |
| 2002/0135618 | A1 * | 9/2002 | Maes | G06F 3/0481 715/767 |
| 2005/0203729 | A1 * | 9/2005 | Roth | H04M 1/72563 704/5 |
| 2006/0080098 | A1 * | 4/2006 | Campbell | G10L 13/027 704/243 |
| 2007/0233489 | A1 * | 10/2007 | Hirose | G10L 13/033 704/258 |
| 2008/0176655 | A1 | 7/2008 | James et al. | |
| 2013/0122982 | A1 * | 5/2013 | Laor | G06F 13/10 463/16 |
| 2013/0158707 | A1 * | 6/2013 | Lee | G06N 5/02 700/246 |
| 2013/0178962 | A1 * | 7/2013 | DiMaria | G06F 17/30038 700/94 |
| 2014/0250195 | A1 | 9/2014 | Capper et al. | |
| 2015/0256636 | A1 | 9/2015 | Spivack et al. | |
| 2016/0071510 | A1 * | 3/2016 | Li | G10L 13/027 704/260 |
| 2016/0078859 | A1 * | 3/2016 | Luan | G10L 13/027 704/260 |
| 2016/0163332 | A1 * | 6/2016 | Un | G10L 13/08 704/260 |
| 2016/0210985 | A1 * | 7/2016 | Deleeuw | G10L 25/63 |
| 2017/0132828 | A1 * | 5/2017 | Zelenin | G06T 7/00 |
| 2017/0277330 | A1 * | 9/2017 | Bae | G06F 3/01 |
| 2018/0024991 | A1 * | 1/2018 | Baldwin | G06F 17/2785 |
| 2018/0286383 | A1 * | 10/2018 | Barari | G10L 13/027 |

OTHER PUBLICATIONS

"Artificial Intelligence news and research articles", http://www.nextos.com/Forum/index.php?p=/discussion/26/artificial-intelligence-news-and-research-articles/p2, Retrieved on: Feb. 27, 2017, 31 pages.

Beck, Koa, "Anybody's Bot", http://www.destinationcrm.com/Articles/Editorial/Magazine-Features/Anybodys-Bot-70830.aspx, Published on: 2000, 4 pages.

"How to create a Facebook chatbot using ChatFuel—Mobilescout", https://www.mobilescout.com/software/news/n72429/Facebook-Chatbot-Using-ChatFuel.html, Published on: Aug. 24, 2016, 9 pages.

Baptista, Neil, "Chatbots: Start here! (Feb. 2017—updated)", https://medium.com/chat-bots-weekly/chatbot-conversational-ui-start-here-2f9250e8cde0, Published on: May 9, 2016, 12 pages.

Quoc, Michael, "11 Examples of Conversational Commerce and Chatbots in 2016", https://chatbotsmagazine.com/11-examples-of-conversational-commerce-57bb8783d332, Published on: May 31, 2016, 18 pages.

McManus, Ashley, "Emotion AI for Chat Bots: The Next Wave of Artificial Intelligence", http://blog.affectiva.com/emotionai-for-chat-bots-the-next-wave-of-artificial-intelligence, Published on: Aug. 4, 2016, 6 pages.

Perez, Sarah, "Tumblr brings back Replies, revamps Notes to encourage more conversations on its service", https://techcrunch.com/2016/03/28/tumblr-brings-back-replies-revamps-notes-to-encourage-more-conversations-on-its-service/, Published on: Mar. 28, 2016, 8 pages.

Pines, Ben, "#NewInElementor: Image Gallery & Image Carousel Widgets", https://elementor.com/v03-image-gallery-and-carousel-widgets/, Published on: Jun. 22, 2016, 15 pages.

* cited by examiner

CONVERSATIONAL SYSTEM USER EXPERIENCE

BACKGROUND

A conversational system and a user may exchange messages during a conversational session using speech, text, or other traditional communication methods. However, the information exchanged during the conversational session may be limited to the traditional communications received from the user and provided by the conversational system.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods relating to conversational system user experience. In an example, a conversational system may use one or more sensors of a user device to gather context information that may be used during a conversational session with a user of the user device. The context information may be used to affect the topic or direction of the conversational session, or to identify a new topic of conversation. In another example, the conversational system may receive input from a user relating to a conversational session, wherein a graphical user interface (GUI) may be displayed on the user device enabling the user to specify or alter semantic information used during the conversational session. The GUI may comprise one or more skeuomorphic elements designed to provide a familiar or intuitive way for the user to interact with the conversational system.

In some examples, the conversational system may use the GUI to convey additional information to the user relating to the conversational session. The GUI may comprise skeuomorphic widgets, which may be used to disambiguate messages or convey emotion or sentiment to the user, among other uses. User device functionality may also be used to convey additional information. As an example, haptic or audio feedback may be provided alongside a message to convey emotion to the user during the conversational session. As a result of the techniques described herein, it may be possible to provide a conversational system that gains an understanding of a user's personality, interests, and habits, while also providing enhanced communication to convey more information to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
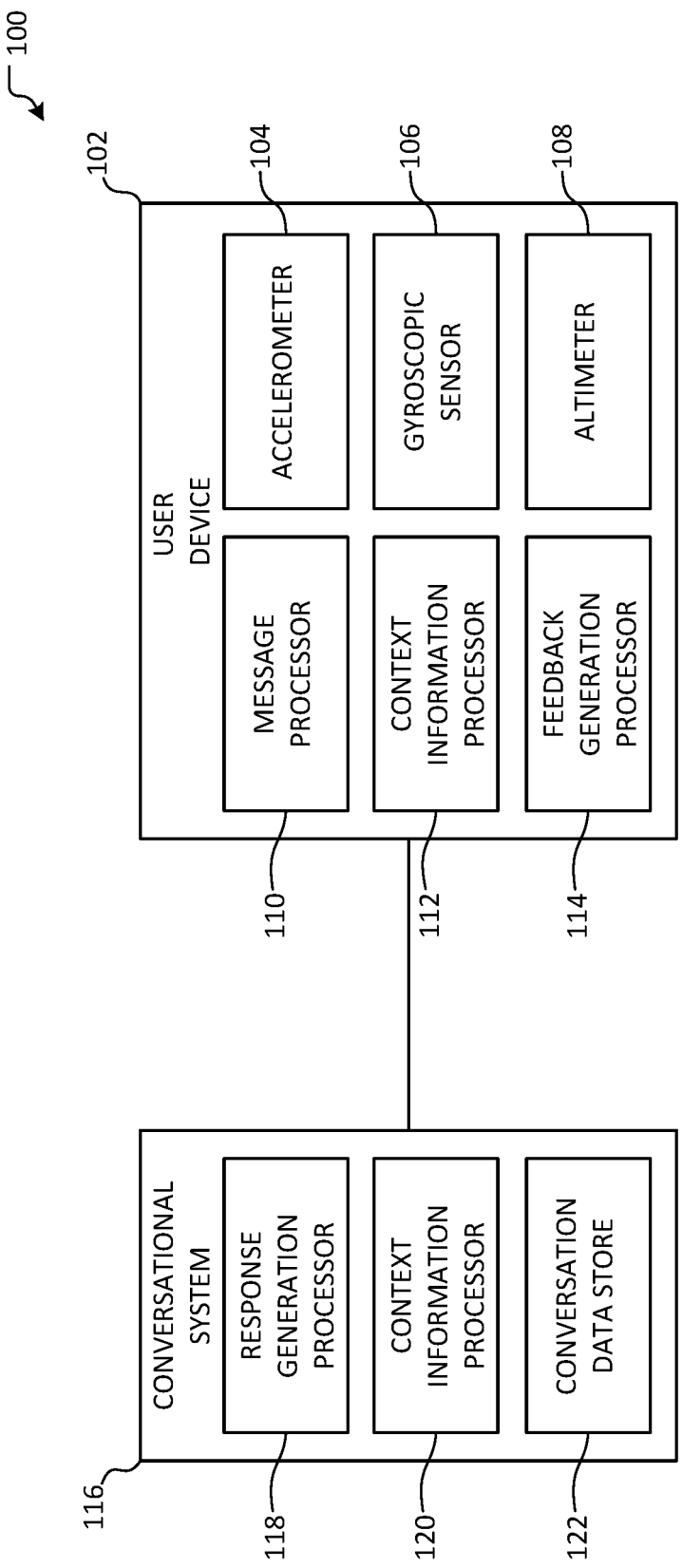
FIG. 1 illustrates an overview of an example system with which aspects of conversational system user experience techniques disclosed herein may be practiced.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

A conversational system may communicate with a user of a user device using any of a variety of traditional communication methods, including, but not limited to, text, speech, image, audio, and video communication. Using a traditional communication method, the conversational system and the user may exchange messages during a conversational session. In some examples, the user device may offer functionality that may be used by the conversational system to gather information for use during the conversational session. In other examples, user device functionality may be used by the conversational system to engage in enhanced communication with the user, wherein the enhanced communication may be in addition to or as an alternative to aspects of traditional communication methods.

As an example, a user device may comprise one or more sensors that may be used by a conversational system to gather information. A sensor may be an accelerometer, a gyroscopic sensor, an altimeter, a global positioning system (GPS) sensor or other location sensor, a microphone, a galvanic skin response sensor, a light sensor, or a touch (or multi-touch) sensor, among other sensors. In some examples, the user device may process sensor input as may be received from the one or more sensors in order to generate context information that may be used by the conversational system when communicating with a user. In other examples, at least a part of the sensor input may be provided to the conversational system, thereby enabling the conversational system to generate context information for subsequent evaluation.

The context information may be used to affect the topic or direction of the conversational session. As an example, context information may be evaluated when generating a response to a message received from a user, thereby incorporating sensor input that may otherwise be unused during a conversational session comprising only traditional communication methods. In another example, context information may be evaluated by the conversational system in order to identify a new topic of conversation (e.g., during a lull in the conversational session, in order to shift conversation topics, etc.). In some examples, the context information may comprise information associated with previous and/or current sensor input (e.g., locations observed by a GPS sensor, temperature readings from a temperature sensor, a determination from one or more health or activity sensors that the user is a runner, etc.). In other examples, the evaluation may comprise evaluating information from a previous or current conversational session (e.g., a previous message from the user, a previous conversation topic, etc.). As an example, if the user references his or her car, and sensor input from an accelerometer sensor indicates the user was or is driving fast, this information may be used to direct the conversational session toward the user's car and/or driving habits. Accordingly, context information may be used to determine information associated with the user (e.g., that the user is a fast driver, that the user is a runner or a swimmer, that the user frequently flies on planes, etc.), which may be used to generate responses when communicating with a user during a conversational session. While example sensor types and techniques are disclosed herein, it will be appreciated that other sensors and techniques may be used without departing from the spirit of this disclosure.

A conversational system may also receive input from a user relating to a conversational session. As an example, a graphical user interface (GUI) may be displayed on the user device, thereby enabling the user to specify or alter semantic information used by the conversational system during the conversational session (e.g., conversation topics, user preferences, response attributes, etc.). For example, the GUI may enable the user to select, narrow, or broaden conversation topics during the conversational session. The GUI may display topics that are related to the current topic of conversation (e.g., the topic may be movies and the GUI may comprise a display of TV shows), narrower than the current topic of conversation (e.g., the topic may be dogs and the GUI may comprise a display of dog breeds), or more broad than the current topic of conversation (e.g., the GUI may comprise a display of various car manufacturers during a conversation about a specific car model). While examples have been discussed above with respect to possible GUI displays, it will be appreciated that any of a variety of topics and elements may be used without departing from the spirit of this disclosure.

In another example, the GUI may enable the user to provide preference indications. The user may be offered a choice of a variety of options, such that the user may be able to select one or more of the options. As a result of selecting one or more of the options, the conversational system may determine that the user has an affinity for a certain subset of the presented options. The determination may then be used to guide subsequent conversations with the user. As an example, as a result of selecting an image of a poodle over an image of a pug, it may be determined that the user has a preference for poodles, such that a subsequent response by the conversational system during a conversation about dogs may be directed toward discussing poodles rather than pugs.

In another example, the GUI may be used to specify the degree to which responses of the conversational system are humorous, serious, sarcastic, empathetic, introverted, extroverted, calm, or panicky, among other response attributes. The user may select or alter the response attributes that are in use by the conversational system, and subsequent responses may be generated accordingly. In some examples, the conversational system may use a vector comprised of a variety of variables and weightings associated with the response attributes. One or more vectors may be evaluated by the conversational system during a conversational session with a user (e.g., when generating a response, when interpreting a message received from the user, etc.). As a result of altering one or more response attributes via the GUI, one or more weightings of a vector may be modified, thereby generating a new vector that may be used by the conversational system for subsequent interactions with the user during the conversational session.

As will be discussed in greater detail below, an element of the GUI may be skeuomorphic, such that it is designed to represent a real-world object having functionality similar to the functionality offered to the user. In an example, a mixing console GUI element may comprise one or more sliders, thereby enabling a user to adjust one or more response attributes by adjusting the position (and, as a result, the associated value) of the slider. In another example, a bookshelf may be used to present a variety of topics to a user, such that the user may select a "book" (or, as a result of selecting a book, a specific chapter or subpart of the book) for discussion with the conversational system. Similarly, a map may be presented to the user, such that the user may select a place of interest for discussion with the conversational system. In some examples, the map may comprise places associated with images, videos, or other information associated with the user (e.g., locations tagged in social networking posts, locations of previous conversational sessions, etc.). While specific GUI elements and functionality are discussed herein, it will be appreciated that other skeuomorphic and user experience techniques may be used without departing from the spirit of this disclosure.

During a conversational session, GUI elements may be presented to the user in order to enhance communication with the user. As an example, in addition to or as an alternative to displaying a skeuomorphic GUI widget to the user for receiving user input, the same or a similar GUI widget may be used to display information. A mixer console (e.g., resembling a physical mixer console device traditionally used for combining, routing, and/or mixing a plurality of audio signals) may display the current "mood" (e.g., one or more response attributes) of the conversational system, thereby enabling the user to view additional information relating to the conversational session. This may enable a user to temper messages with the conversational system (e.g., such that certain responses may be solicited from the conversational system, such that a conversational session may be directed toward certain topics, etc.). As discussed above, the mixer console may be interactive, thereby enabling a user to adjust response attributes in addition to viewing them. In another example, a word cloud may be displayed, wherein the word cloud may display words associated with the current conversational session as perceived by the conversational system. In some examples, the GUI element for the word cloud may be skeuomorphic, such that it may be displayed in a thought bubble. The user may be able to select one or more of the displayed words in order to guide the conversational session (e.g., by narrowing, broadening, or changing the topic of conversation). In other examples, images, animated images, or videos may be displayed in addition to or as an alternative to words in the word cloud. It will be appreciated that other skeuomorphic elements or user experience techniques may be used to enhance communication with the user without departing from the spirit of this disclosure.

User device functionality may be used to enhance communication with the user. As an example, haptic and/or audio feedback may be used to convey information relating to a conversational session in addition to or as an alternative to aspects of traditional communication. Haptic feedback may be used to convey an emotion associated with a response provided by the conversational system. For example, a fast, high-intensity vibration pattern may be used to convey excitement, while a slow, low-intensity vibration pattern may convey lethargy or disappointment. In another example, haptic feedback may be used to convey a simulated heartbeat of the conversational system, which may change throughout the course of the conversational session with the user. Similarly, audio feedback may be used in addition to or as an alternative to haptic feedback. Audio patterns and/or pitch may be varied depending on the current topic or emotion associated with the conversational session. As an example, low-pitched, down-tempo audio feedback may be used to convey a serious emotion, while higher-pitched, up-tempo audio feedback may convey a whimsical or happy emotion. It will be appreciated that other feedback may be used to convey emotion or other information associated with a conversational session without departing from the spirit of this disclosure.

FIG. 1 illustrates an overview of an example system 100 with which aspects of conversational system user experience techniques disclosed herein may be practiced. System 100 comprises user device 102 and conversational system 116. In an example user device 102 may be a personal computing device, a mobile computing device, a tablet computing device, or a cellular communication device, among other devices. User device 102 may be used by a user of conversational system 116. In some examples, user device 102 may communicate with conversational system 116 using a network (e.g., the Internet, a local area network, a telephone communication network, etc.). In other examples, user device 102 may communicate with conversational system 116 using a service, such as an instant messaging service or other electronic communication service.

User device 102 may comprise an accelerometer 104, a gyroscopic sensor 106, an altimeter 108, a message processor 110, a context information processor 112, and a feedback generation processor 114. While user device 102 is illustrated as having three sensors 104-108, it will be appreciated that user device 102 may comprise additional, fewer, or different sensors. Sensors 104-108 may be used by context information processor 112 to generate context information from sensor input received from one or more of sensors 104-108. As an example, context generation processor 112 may evaluate information from one or more of sensors 104-108 in order to categorize a behavior of the user device and/or user, to identify an expressed emotion, or to identify a pattern (e.g., location frequency, work schedule, etc.), among others. Context information generated by context information processor 112 may be provided to conversational system 116 and/or may be processed locally on user device 102 (e.g., by message processor 110). In some examples, context information that is provided to conversational system 116 may be anonymized, generalized, or otherwise processed so as to protect the privacy of the user and/or the user device.

Message processor 110 may process messages that are received from conversational system 116 and/or messages that are received from a user of user device 102. In some examples, message processor 110 may determine an emotion for a received message, and may provide an indication to feedback generation processor 114. In other examples, message processor 110 may use context information (e.g., as may be received from context information processor 112) to evaluate a received message (e.g., to determine a meaning for an ambiguous term, to identify a user interest or personality trait, etc.). In an example, message processor 110 may provide an offline conversational system experience (e.g., by using an offline response generation processor, not pictured, and/or a response data store, not pictured). The offline conversational system experience may be provided when conversational system 116 is unavailable (e.g., there is a connectivity issue, user device 102 is in a limited communication mode, etc.).

Feedback generation processor 114 may receive an emotion or other information associated with a message (e.g., as may be received from message processor 110 and/or conversational system 116). Feedback generation processor 114 may generate feedback using functionality provided by user device 102, such as haptic feedback using a vibration motor (not pictured) and/or audio feedback using a speaker (not pictured). While specific actions are discussed with respect to elements 110-114, it will be appreciated that similar functionality may be provided by other elements of user device 102 and/or of conversational system 116.

Conversational system 116 may be any of the devices described above, or may be a distributed computing device comprised of any number of devices, which may be used to provide elements 118-122. Conversational system 116 comprises response generation processor 118, context information processor 120, and conversation data store 122. In an example, one or more of elements 118-122 may be used by conversational system 116 to engage in a conversational session with user device 102. While system 100 is illustrated as having one user device 102 and one conversational system 116, it will be appreciated that a conversational system may communicate with any number of user devices and any number of conversational systems may be used.

Response generation processor 118 may receive and transmit messages to user device 102, thereby engaging in a conversational session. Response generation processor 118 may receive messages from user device 102 in any of a variety of formats, including, but not limited to, in text format, as an audio file, as a video stream, or any combination thereof. Based on a received message, response generation processor 118 may process the message to generate a response. In an example, generating a response may comprise identifying, from a set of potential responses, a relevant response as compared to the received message. In another example, generating a response may comprise determining a domain associated with the message and performing additional processing of the message based on the determined domain. Response generation processor 118 may provide a generated response to a user device in a similar or different format as compared to the format of the received message. While example operations are discussed above with respect to response generation processor 118, it will be appreciated that any of a variety of operations may be used when generating a response to received input. In some examples, response generation processor 118 may evaluate information from context information processor 120 and/or conversation data store 122 when interpreting a received message or generating a response according to aspects disclosed herein. In other examples, response generation processor 118 may receive context information separate from a message.

Similar to context information processor 112, context information processor 120 may process sensor input as may be received from user device 102. In an example, sensor input may be received with messages from user device 102, or may be received separately. In some examples, the sensor input may comprise information that has already been processed at user device 102 (e.g., a compressed or abridged representation, an interpretation of the sensor input, an output of context information processor 112, etc.). Context information processor 120 may be used to provide or determine context for messages received from user device 102 and messages generated for response to user device 102 during a conversational session. As an example, context information processor 120 may be used to disambiguate a word or phrase in a received message or to identify new topics of conversation (e.g., related to a determined user interest, as may be determined based on information from sensors 104-108, etc.), among others.

Conversation data store 122 may store conversation history, conversation metadata, or other information relating to or used by conversational system 116. In an example, conversation data store 122 may comprise a local storage device or a database, among other local storage systems. In another example, conversation data store 122 may comprise a remote storage system, including, but not limited to, a distributed storage system or a networked storage device. In some examples, at least a part of the information stored by conversation data store 122 may be anonymized, omitted, or otherwise altered so as to protect the identities of users of conversational system 122. In other examples, conversation data store 122 may store information used or generated by context information processor 120.

Figure 2:
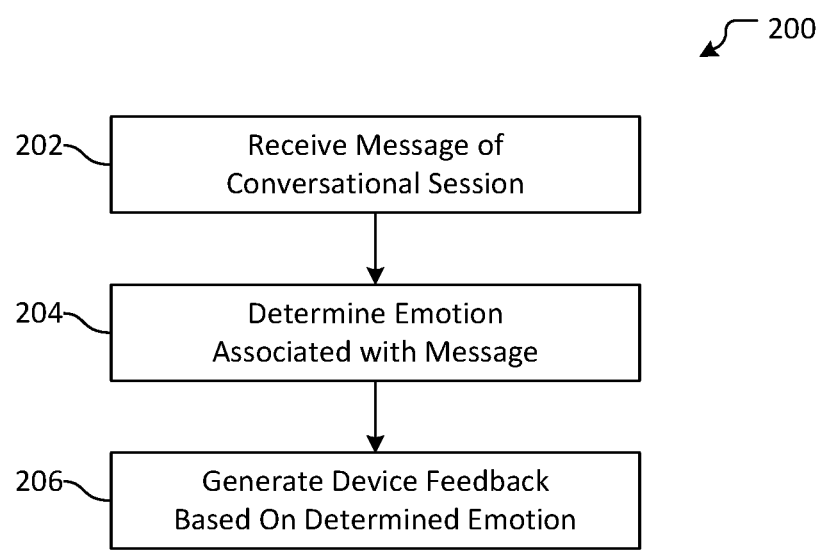
FIG. 2 illustrates an overview of an example method for generating device feedback in a conversational system.

FIG. 2 illustrates an overview of an example method 200 for generating device feedback in a conversational system. Aspects of method 200 may be performed by one or more computing devices, including, but not limited to, a mobile computing device, a personal computing device, a tablet computing device, a server computing device, or a distributed computing device. As an example, aspects of method 200 may be performed by user device 102 and/or conversational system 116 in FIG. 1. Method 200 begins at operation 202, where a message of a conversational session may be received. In some examples, the message may be received from a conversational system (e.g., conversational system 116 in FIG. 1) or may have been generated (e.g., by message processor 110 or response generation processor 118 in FIG. 1).

At operation 204, an emotion associated with the received message may be determined. Determining the emotion may comprise analyzing the received message, analyzing other messages of the conversational session, analyzing context information associated with the received message, or any combination thereof. In some examples, determining the emotion may comprise evaluating one or more indications that may have been received with the message (e.g., as may have been provided by a conversational system, such as conversational system 116 in FIG. 1). While method 200 is discussed herein with respect to a single emotion, it will be appreciated that other examples may include multiple emotions.

Moving to operation 206, device feedback may be generated based on the determined emotion. In an example, device feedback may be generated by feedback generation processor 114 in FIG. 1. Generating device feedback may comprise providing haptic feedback via a vibration motor and/or audio feedback using a speaker. The device feedback may be generated so as to convey the determined emotion. As an example, a fast, high-intensity vibration pattern may be used to convey excitement, while a slow, low-intensity vibration pattern may convey lethargy or disappointment. In another example, low-pitched, down-tempo audio feedback may be used to convey a serious emotion, while higher-pitched, up-tempo audio feedback may convey a whimsical or happy emotion. It will be appreciated that other device feedback may be used to convey emotion or other information associated with the received message without departing from the spirit of this disclosure. Flow terminates at operation 206.

Figure 3:
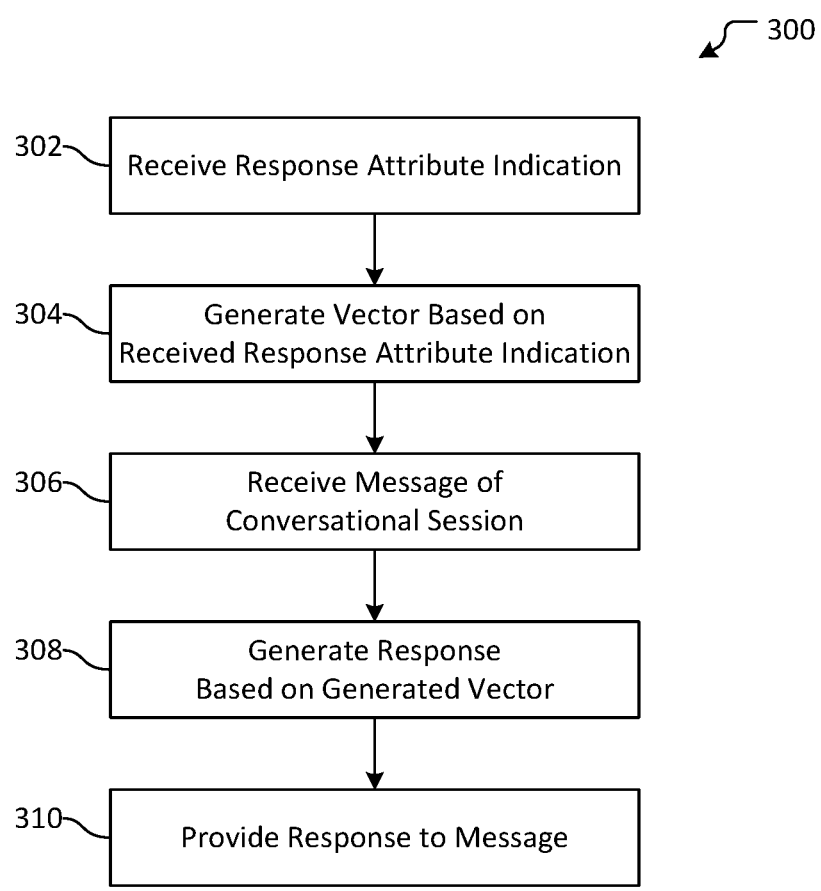
FIG. 3 illustrates an overview of an example method for adjusting response attributes in conversational system.

FIG. 3 illustrates an overview of an example method 300 for adjusting response attributes in a conversational system. In an example, method 300 may be performed by a conversational system, such as conversational system 116 in FIG. 1. At operation 302, a response attribute indication may be received. The response attribute indication may be received from a user device, and may be received as a result of a user interacting with a GUI according to aspects disclosed herein. As an example, the user device may display an interface comprising one or more response attributes in use by the conversational system. In another example, the interface may comprise response attributes available for use by the conversational system, wherein the response attributes may not currently be in use. In some examples the interface may be a mixer console or a mobile (which will be discussed in greater detail below with respect to FIGS. 4 and 5, respectively), or have other skeuomorphic aspects. The response attribute indication may indicate a value or change for a response attribute, such as the degree to which messages generated by the conversational system are humorous, serious, sarcastic, empathetic, introverted, extroverted, calm, or panicky, among other response attributes.

Moving to operation 304, a vector may be generated based on the received response attribute indication. The vector may be comprised of a variety of variables and weightings associated with response attributes. As an example, there may be a variable associated with a "happiness" response attribute, and the weighting applied to the variable may be changed based on a received response attribute indication relating to the happiness response attribute. Accordingly, a new vector may be generated comprising the updated weighting for the happiness response attribute.

At operation 306, a message of a conversational session may be received. The message may have been received from a user device (e.g., user device 102 in FIG. 1). The message may be any of a variety of formats, including, but not limited to, a text message, an audio message, a video message, or a data stream, among others. Moving to operation 308, a response to the message may be generated based on the vector generated at operation 304. In an example, generating a response may comprise identifying, from a set of potential responses, a relevant response as compared to the received message. The identified relevant response may be adapted based on the vector. As an example, word embeddings may be used to shift or alter the meaning of words of phrases in the relevant response, so as to generate a response having a similar meaning but conveying a different sentiment or emotion. In another example, multiple sets of potential responses may be used, wherein each set may be associated with one or more response attributes. As an example, there may be a set of responses that is generally happy, while another set comprises responses that are more sarcastic. While example techniques are described herein, it will be appreciated that other techniques may be used to generate a response based on one or more response attributes.

Flow progresses to operation 310, where the generated response is provided. Providing the generated response may comprise transmitting the response to the user device using a network, messaging service, or other method according to aspects disclosed herein. In some examples, the response may be transmitted with an emotion associated with the response, such that the user device may generate feedback accordingly. Flow terminates at operation 310.

Figure 4:
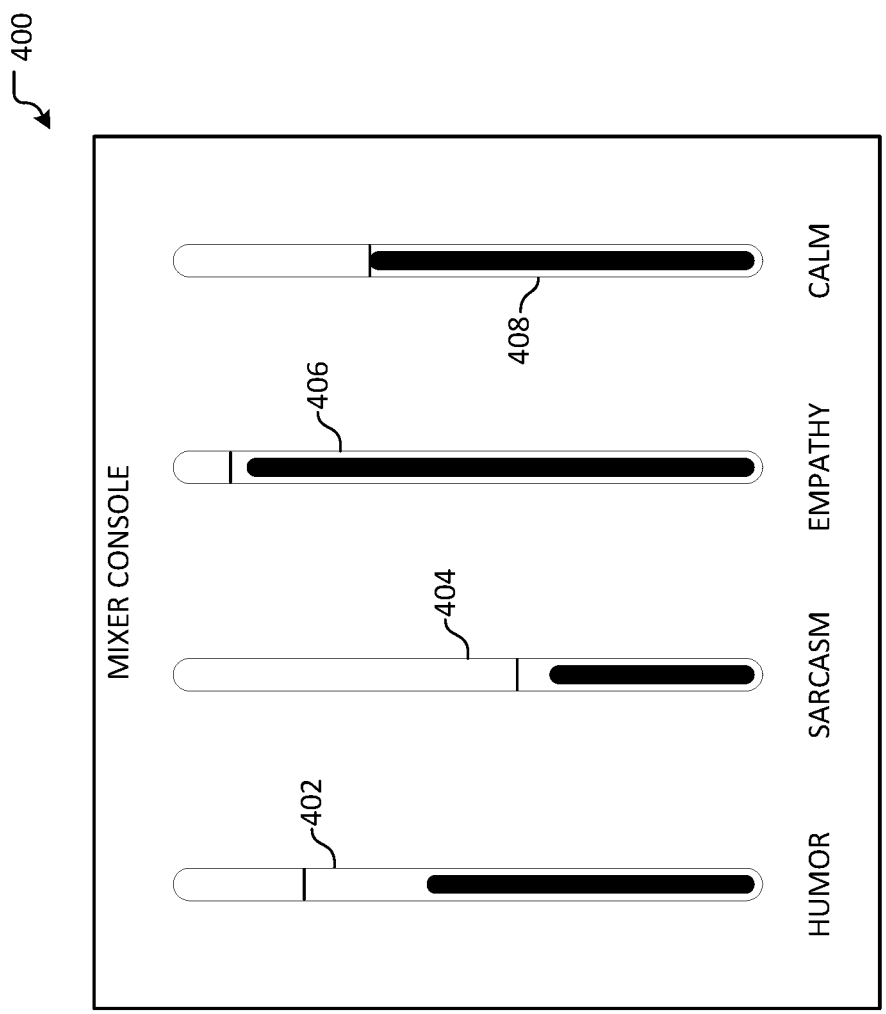
FIG. 4 illustrates an overview of an example graphical user interface element relating to conversational system user experience.

FIG. 4 illustrates an overview of an example graphical user interface element 400 relating to conversational system user experience. As illustrated, GUI element 400 is skeuomorphic, in that it resembles a mixer console. GUI element 400 is comprised of four meters: humor meter 402, sarcasm meter 404, empathy meter 406, and calm meter 408. In an example, each of meters 402-408 may be associated with a response attribute. As described above, GUI element 400 may be displayed on a user device, such that a user may adjust and/or view values associated with each of meters 402-408. The values of meters 402-408 may be used to generate a vector comprising response attributes, as was discussed above with respect to FIG. 3.

As illustrated, each of meters 402-408 comprises a horizontal line, indicating the maximum value of the meter within a timeframe. In some examples, the values of meters 402-408 may display values associated with response attributes in use by the conversational system at a given time. As an example, the meters may move as a speech response from the conversational system is played to the user by the user device. In other examples, the user may adjust the values of meters 402-408 while the conversational system is responding, thereby enabling the user to dynamically alter the behavior of the conversational system. While aspects of an example mixer console GUI element have been discussed with respect to FIG. 4, it will be appreciated that other values, response attributes, or quantities may be used without departing from the spirit of this disclosure.

Figure 5:
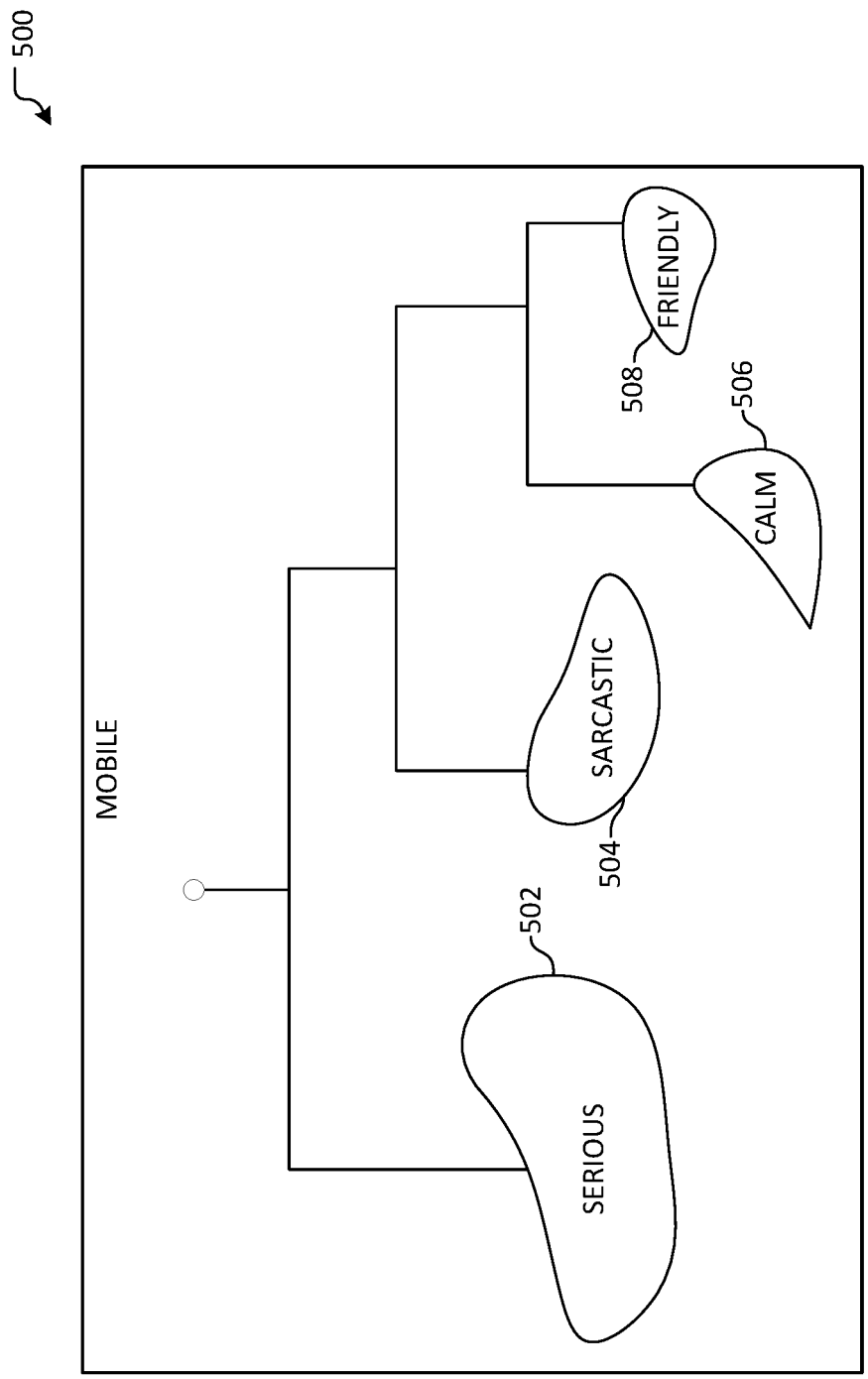
FIG. 5 illustrates an overview of an example graphical user interface element relating to conversational system user experience.

FIG. 5 illustrates an overview of an example graphical user interface element 500 relating to conversational system user experience. As illustrated, GUI element 500 is skeuomorphic, in that it resembles a kinetic mobile sculpture. GUI element 500 is comprised of four objects: serious object 402, sarcastic object 504, calm object 506, and friendly object 508. In an example, each of objects 502-508 may be associated with a response attribute. As described above, GUI element 500 may be displayed on a user device, such that a user may adjust and/or view values associated with each of objects 502-508. The values of objects 502-508 may be used to generate a vector comprising response attributes, as was discussed above with respect to FIG. 3.

As illustrated, objects 502-508 are interconnected by a series of lines, such that the mobile is in balance. The relationship between objects 502-508 may demonstrate to a user that the response attributes (e.g., serious, sarcastic, calm, and friendly) may be interconnected. As a result, altering one of the response attributes may impact another. As an example, a user may indicate that the conversational system should be more friendly by raising the position of friendly object 508 in GUI element 500, causing the friendly response attribute associated with friendly object 508 to be increased. As a result of moving friendly object 508, the position of sarcastic object 504 may fall as a result of the simulated "weight" of friendly object 508 being reduced. The resulting values of the response attributes may be used to generate subsequent responses by the conversational system. While an example mobile has been discussed with respect to FIG. 5, it will be appreciated that other values, response attributes, or quantities may be used without departing from the spirit of this disclosure.

Figure 6:
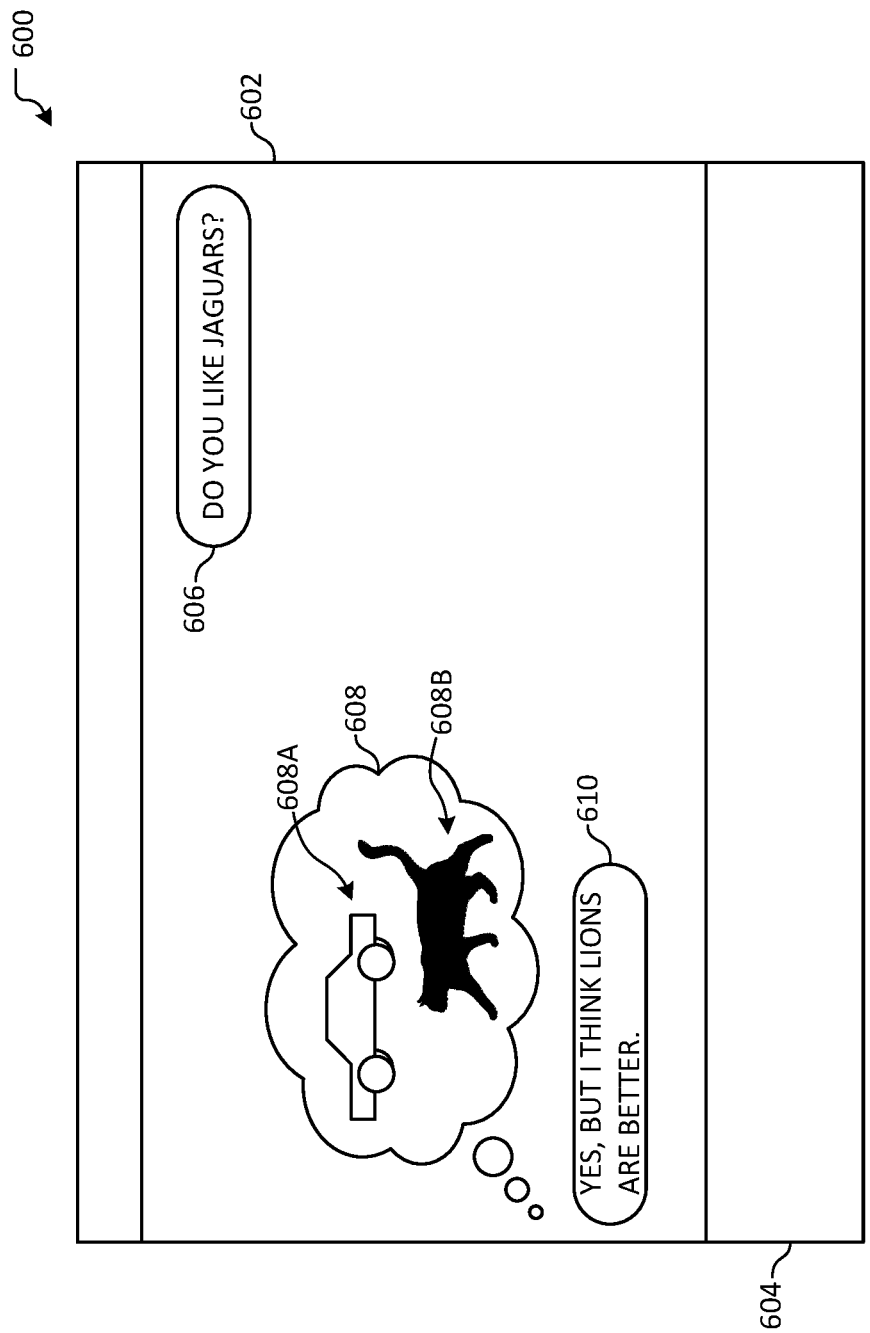
FIG. 6 illustrates an overview of an example graphical user interface relating to conversational system user experience.

FIG. 6 illustrates an overview of an example graphical user interface 600 relating to conversational system user experience. As illustrated, GUI 600 is comprised of conversation pane 602 and text input region 604. A user may enter text into text input region 604, which may be displayed in conversation pane 602 (e.g., as message 606). Similarly, a response from a conversational system may be received and displayed in conversation pane 602 (e.g., as messages 608 and 610). In some examples, the conversational system may be conversational system 116 in FIG. 1.

As illustrated, a user of GUI 600 has transmitted message 606, comprising the text "DO YOU LIKE JAGUARS?" The content of the message may be received by the conversational system, which may generate a response to the message. In some examples, the conversational system may determine that the term "JAGUARS" in the message is ambiguous. The determination may comprise evaluating context in order to resolve the ambiguity, as was discussed above. However, in an example, the conversational system may be unable to resolve the ambiguity. As a result, the conversational system may provide a plurality of options from which the user may make a selection. As illustrated, thought bubble 608 comprises options 608A and 608B. Thought bubble 608 is skeuomorphic, in that it resembles a thought bubble to indicate one or more things about which the conversational system may be "thinking." While options 608A and 608B are shown as images, it will be appreciated that any type of option may be presented to the user, including, but not limited to, text, animated images, or videos.

The user may make a selection of the options presented in thought bubble 608. As illustrated, the user may select option 608B to indicate that the user is referring to a jaguar animal rather than a Jaguar car. An indication of the user's selection may be provided to the conversational system, which may proceed to generate a response to message 606 based on the user's selection. The conversational system may provide the generated response, which may be displayed in GUI 600 as exemplary message 610, comprising the text "YES, BUT I THINK LIONS ARE BETTER." It will be appreciated that while thought bubble 608 is illustrated as having two options, additional options of different types may be presented without departing from the spirit of this disclosure.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

Figure 7:
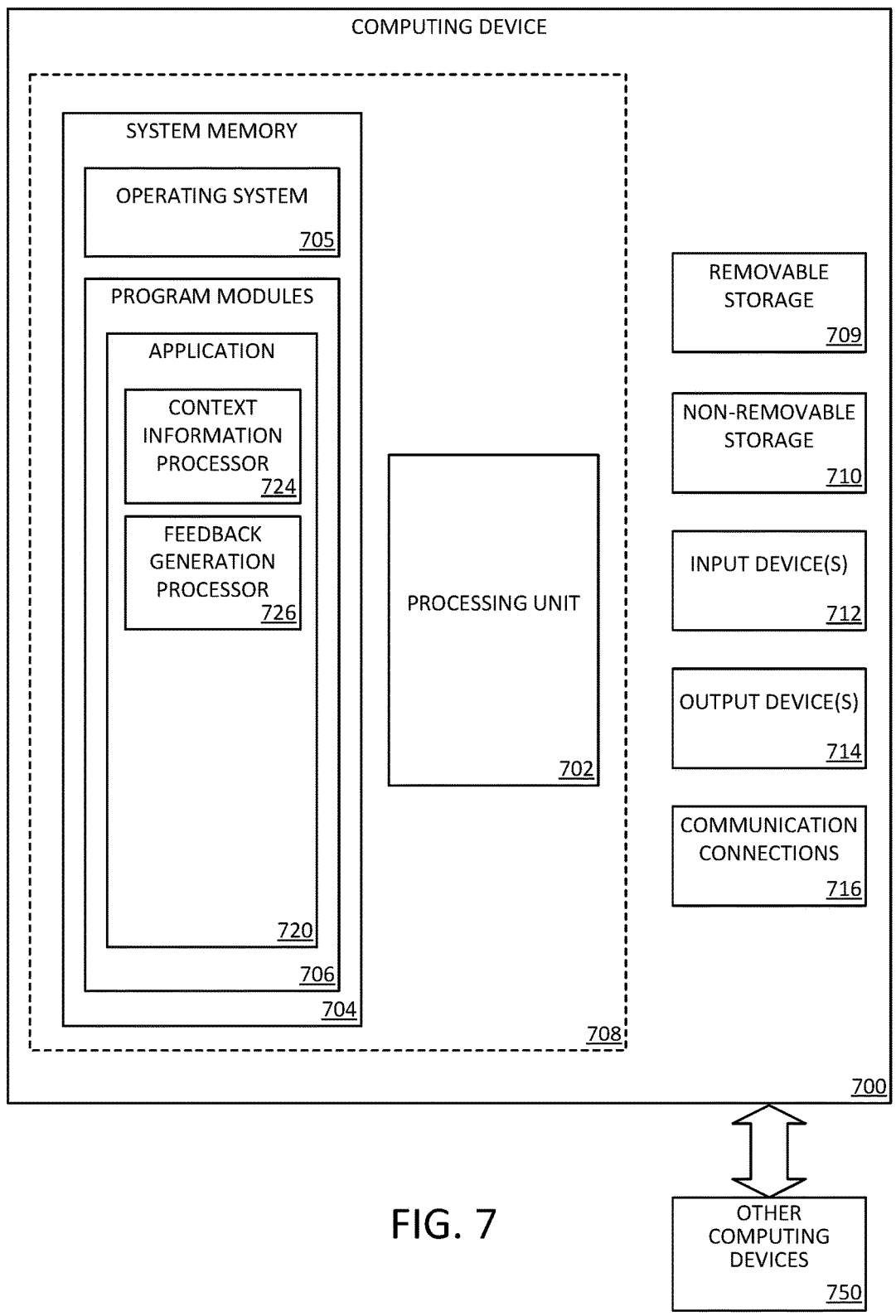
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for performing the various aspects disclosed herein such as context information processor 724 and feedback generation processor 726. The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
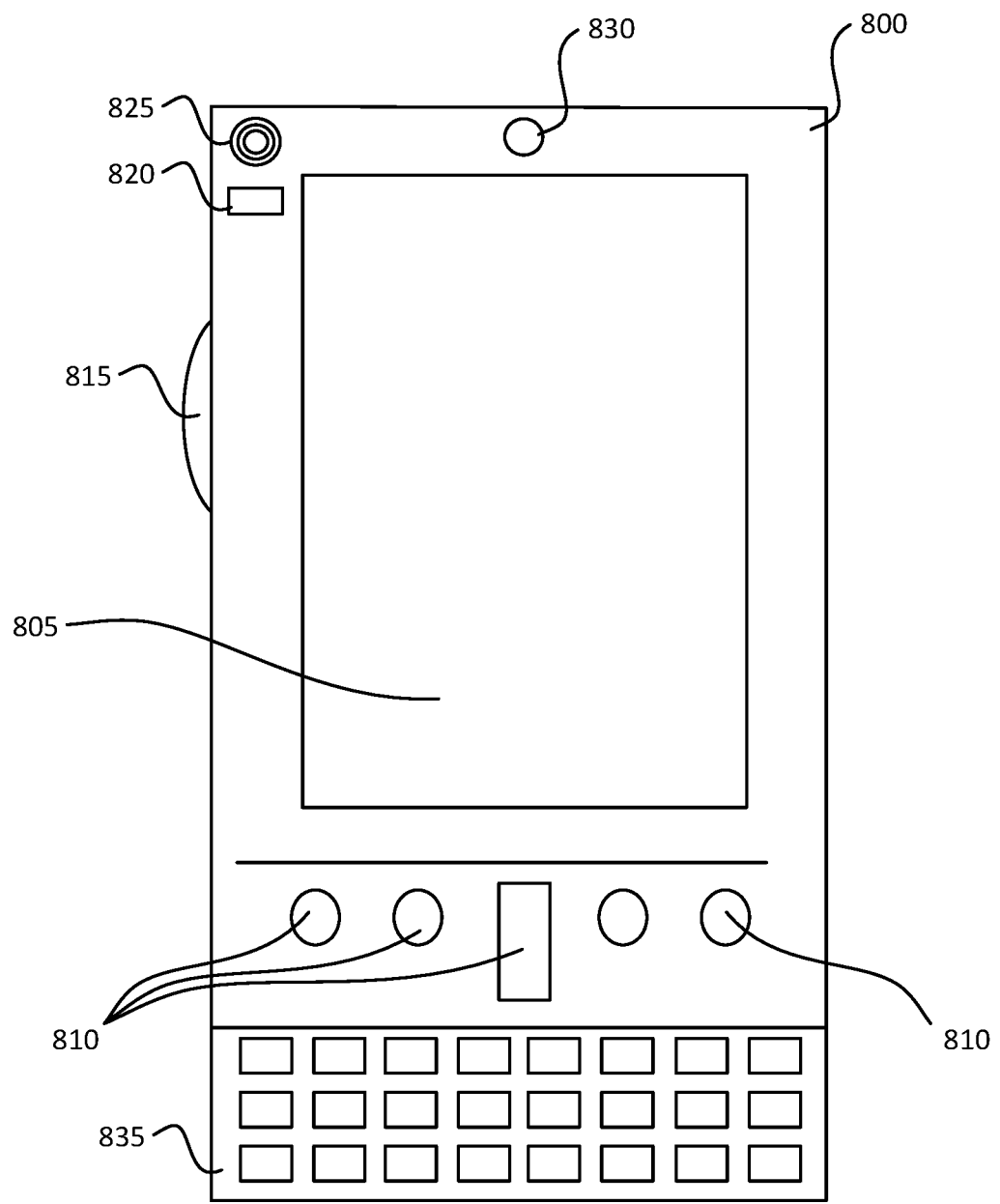
FIG. 8A and 8B are simplified block diagrams of a mobile computing device with which aspects of the present disclosure may be practiced.
Figure 8B:
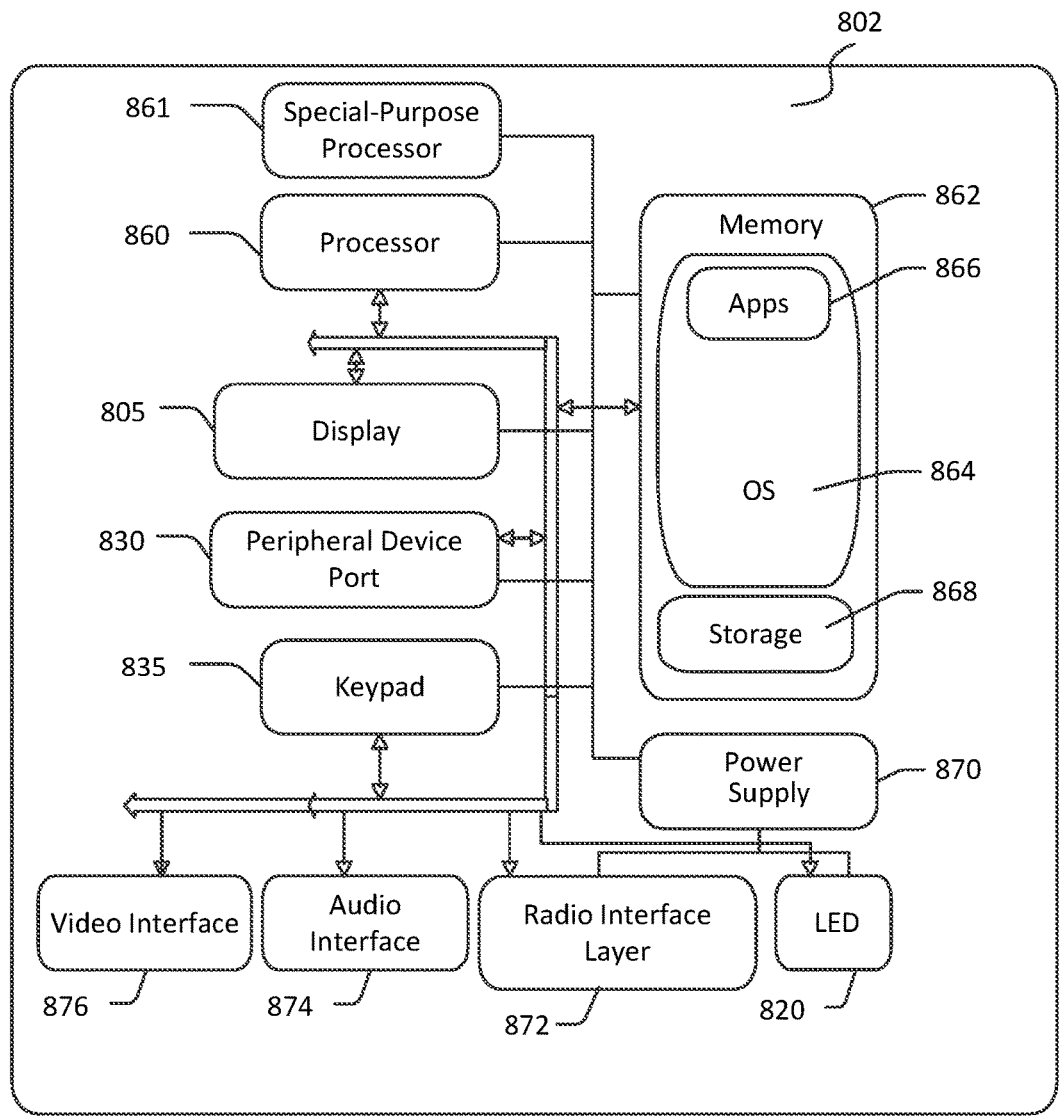

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., search engine, extractor module, relevancy ranking module, answer scoring module, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
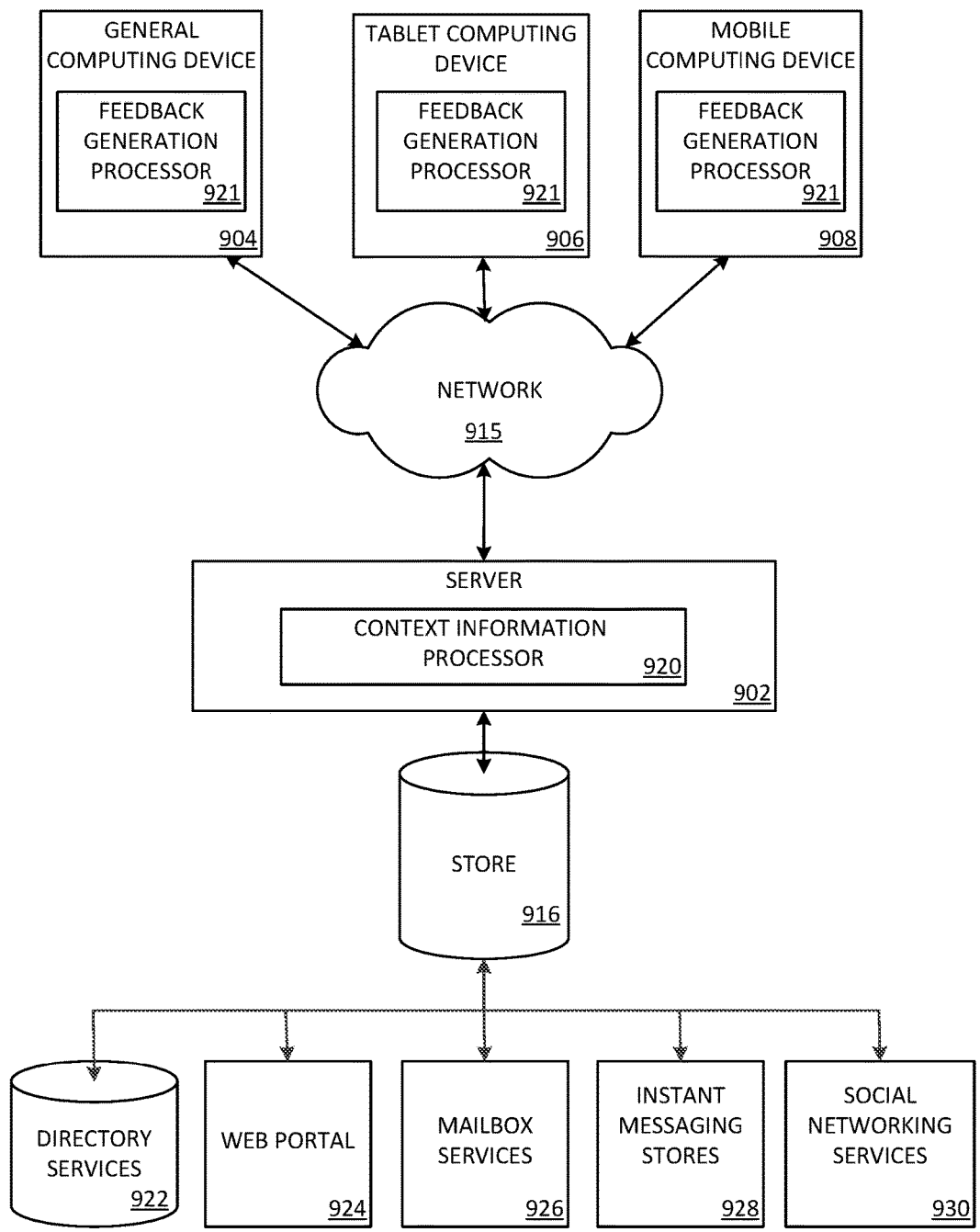
FIG. 9 is a simplified block diagram of a distributed computing system in which aspects of the present disclosure may be practiced.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. Feedback generation processor 921 may be employed by a client that communicates with server device 902, and/or context information processor 920 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
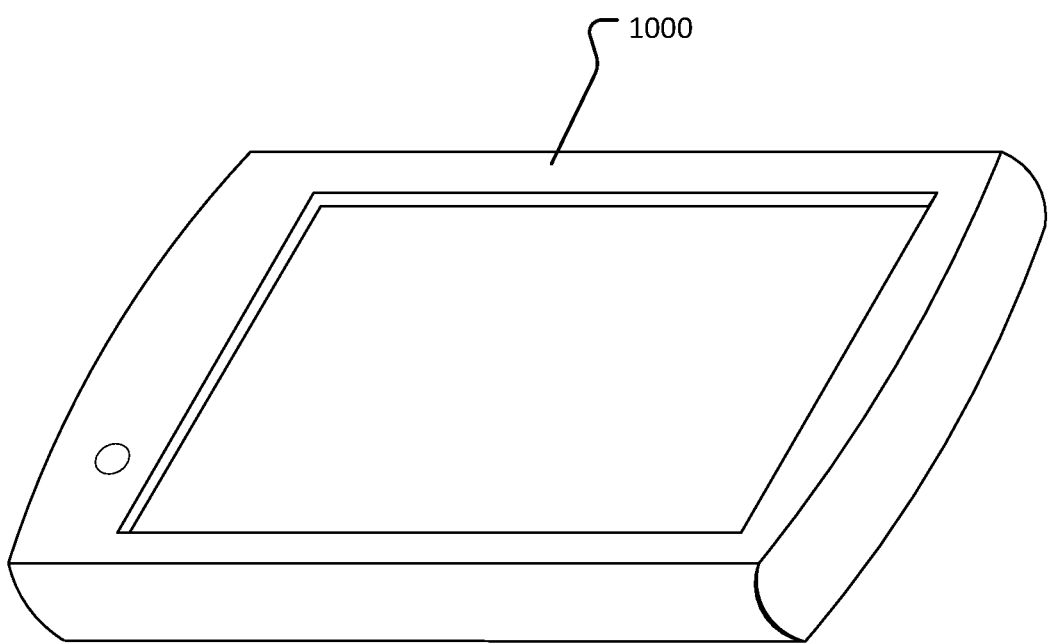
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: receiving, from a user device of a conversational system, a response attribute indication; generating, based on the response attribute indication, a vector for use during a conversational session; receiving, as part of the conversational session, a message from the user device; generating, based on the vector, a response to the message; and providing the generated response to the user device. In an example, the response attribute indication comprises a value, and generating the vector comprises using the value as a weight for a variable of a response attribute associated with the response attribute indication. In another example, generating the response comprises: determining context information associated with the conversational session, wherein the context information comprises information associated with one or more sensors of the user device; and generating, based on the context information, the response to the message. In a further example, generating the response comprises determining an emotion for the generated response, and wherein providing the generated response comprises providing the determined emotion to the user device. In yet another example, the set of operations further comprises: changing, based on a change to a first response attribute indicated by the response attribute indication, a second response attribute, wherein the second response attribute is related to the first response attribute. In a further still example, the response attribute indication is received as a result of a user interaction with a skeuomorphic graphical user interface element displayed by the user device. In another example, the response attribute indication comprises an indication relating to a characteristic of a message to be generated by the conversational system.

In another aspect, the technology relates to a computer-implemented method. The method comprises: receiving, from a user device, a message associated with a conversational session; generating, based on the message and the conversational session, a response to the message; determining, based on the response and the conversational session, an emotion for the response; and providing the response and the emotion to the user device, thereby causing the user device to provide feedback associated with the determined emotion. In an example, generating the response comprises: determining context information associated with the conversational session, wherein the context information comprises information associated with one or more sensors of the user device; and generating, based on the context information, the response to the message. In another example, determining the emotion comprises evaluating one or more response attributes associated with the conversational session. In a further example, the provided feedback comprises updating a skeuomorphic graphical user interface element displayed by the user device. In yet another example, provided feedback comprises haptic feedback associated with the determined emotion. In a further still example, the provided feedback comprises audio feedback associated with the determined emotion.

In a further aspect, the technology relates to another computer-implemented method. The method comprises: receiving, from a user device during a conversational session, a response attribute indication; generating, based on the response attribute indication, a vector for use during the conversational session; receiving, as part of the conversational session, a message from the user device; generating, based on the vector, a response to the message; and providing the generated response to the user device. In an example, the response attribute indication comprises a value, and generating the vector comprises using the value as a weight for a variable of a response attribute associated with the response attribute indication. In another example, generating the response comprises: determining context information associated with the conversational session, wherein the context information comprises information associated with one or more sensors of the user device; and generating, based on the context information, the response to the message. In a further example, generating the response comprises determining an emotion for the generated response, and wherein providing the generated response comprises providing the determined emotion to the user device. In yet another example, the method further comprises changing, based on a change to a first response attribute indicated by the response attribute indication, a second response attribute, wherein the second response attribute is related to the first response attribute. In a further still example, the response attribute indication is received as a result of a user interaction with a skeuomorphic graphical user interface element displayed by the user device. In another example, the response attribute indication comprises an indication relating to a characteristic of a message to be generated by the conversational system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory storing instructions that, when executed by the at least one processor, causes the system to perform a set of operations, the set of operations comprising:
receiving, from a user device of a conversational system, a response attribute indication, wherein the response attribute indication comprises at least one response attribute to affect the operation of the conversational system;
generating, based on the response attribute indication, a vector for use during a conversational session;
receiving, as part of the conversational session, a message from the user device;
generating, from a set of potential responses associated with the at least one response attribute, a response to the message based on the vector; and
providing the response to the user device.

2. The system of claim 1, wherein the response attribute indication comprises a value, and generating the vector comprises using the value as a weight for a variable of a response attribute associated with the response attribute indication.

3. The system of claim 1, wherein generating the response comprises:
determining context information associated with the conversational session, wherein the context information comprises information associated with one or more sensors of the user device; and
generating, based on the context information, the response to the message.

4. The system of claim 1, wherein generating the response comprises determining an emotion for the generated response, and wherein providing the generated response comprises providing the determined emotion to the user device.

5. The system of claim 1, wherein the set of operations further comprises:
changing, based on a change to a first response attribute indicated by the response attribute indication, a second response attribute, wherein the second response attribute is related to the first response attribute.

6. The system of claim 1, wherein the response attribute indication is received as a result of a user interaction with a skeuomorphic graphical user interface element displayed by the user device.

7. The system of claim 1, wherein the response attribute indication comprises an indication relating to a characteristic of a message to be generated by the conversational system.

8. A computer-implemented method, comprising:
receiving, from a user device, a first message associated with a conversational session;
generating, based on a first response attribute for the conversational session, a first response to the first message;
providing the first response to the user device;
receiving a response attribute indication from the user device, wherein the response attribute indication comprises a second response attribute to affect the operation of the conversational system;
generating, based on the second response attribute, a second response to a second message associated with the conversational session; and
providing the second response to the user device.

9. The computer-implemented method of claim 8, wherein generating a response to a message from the user device comprises:
determining context information associated with the conversational session, wherein the context information comprises information associated with one or more sensors of the user device; and
generating, based on the context information, the response to the message.

10. The computer-implemented method of claim 8, wherein generating a response to a message from the user device comprises:
determining an emotion for the response by evaluating one or more response attributes associated with the conversational session;
and providing the emotion as part of the response.

11. The computer-implemented method of claim 8, wherein the method further comprises causing the user device to provide feedback associated with at least one of the first response and the second response, and wherein the provided feedback comprises updating a skeuomorphic graphical user interface element displayed by the user device.

12. The computer-implemented method of claim 8, wherein the method further comprises causing the user device to provide feedback associated with at least one of the first response and the second response, and wherein the provided feedback comprises haptic feedback associated with the determined emotion.

13. The computer-implemented method of claim 8, wherein the method further comprises causing the user device to provide feedback associated with at least one of the first response and the second response, and wherein the provided feedback comprises audio feedback associated with the determined emotion.

14. A computer-implemented method for adjusting a response attribute of a conversational system, comprising:
receiving, from a user device during a conversational session, a response attribute indication, wherein the response attribute indication comprises at least one response attribute to affect the operation of the conversational system;
generating, based on the response attribute indication, a vector for use during the conversational session;
receiving, as part of the conversational session, a message from the user device;
generating, from a set of potential responses associated with the at least one response attribute, a response to the message based on the vector; and
providing the generated response to the user device.

15. The method of claim 14, wherein the response attribute indication comprises a value, and generating the vector comprises using the value as a weight for a variable of a response attribute associated with the response attribute indication.

16. The method of claim 14, wherein generating the response comprises:
determining context information associated with the conversational session, wherein the context information comprises information associated with one or more sensors of the user device; and generating, based on the context information, the response to the message.

17. The method of claim 14, wherein generating the response comprises determining an emotion for the generated response, and wherein providing the generated response comprises providing the determined emotion to the user device.

18. The method of claim 14, further comprising:
changing, based on a change to a first response attribute indicated by the response attribute indication, a second response attribute, wherein the second response attribute is related to the first response attribute.

19. The method of claim 14, wherein the response attribute indication is received as a result of a user interaction with a skeuomorphic graphical user interface element displayed by the user device.

20. The method of claim 14, wherein the response attribute indication comprises an indication relating to a characteristic of a message to be generated by the conversational system.

* * * * *